March 16, 1954   F. I. RATAICZAK   2,672,021
DEFROSTING REFRIGERATING APPARATUS
Filed April 28, 1951   5 Sheets-Sheet 1

INVENTOR.
Francis I. Rataiczak
BY
Willkie, Hardman & Fehr.
Attorneys.

INVENTOR.
Francis I. Rataiczak

March 16, 1954  F. I. RATAICZAK  2,672,021
DEFROSTING REFRIGERATING APPARATUS
Filed April 28, 1951  5 Sheets-Sheet 4

INVENTOR.
Francis I. Rataiczak
BY
Willits, Hardman & Fehr.
Attorneys

INVENTOR.
Francis I. Rataiczak.
BY
Willits, Hardman & Fehr.

Patented Mar. 16, 1954

2,672,021

UNITED STATES PATENT OFFICE 2,672,021

DEFROSTING REFRIGERATING APPARATUS

Francis I. Ratajczak, Dayton, Ohio, assignor to General Motors Corporation, Dayton, Ohio, a corporation of Delaware Application April 28, 1951, Serial No. 223,571

8 Claims. (Cl. 62—4)

This invention relates to refrigerating apparatus.

An object of this invention is to provide an improved mechanical refrigerator which is adapted to be manufactured in large quantities and to be distributed and used throughout various States of the United States. The refrigerator is provided in its upper portion with a very low temperature frozen food compartment of rectangular cross section adapted to receive rectangular frozen food packages, to be fully packed with them, and to prevent local warm spots among such frozen food packages. The refrigerator is also provided with an unfrozen food compartment to be maintained at a substantially constant refrigerating temperature, above 32° F., which compartment is adapted to receive foods in large quantities which are to be maintained above 32° F. and which are not likely to be dehydrated. The refrigerator also is provided with a space within the unfrozen food compartment in which relatively high humidities are maintained and in which foods may be preserved which are likely to otherwise become dehydrated. Notwithstanding these advantages, the refrigerator is adapted to operate satisfactorily in varying atmospheric temperatures ranging from below 60° to as high as 120°. It is also adapted to operate satisfactorily in varying degrees of atmospheric humidity, frequently reaching substantially the saturation point of 100% relative humidity without danger of accumulating undesirable moisture within the compartments or within the insulation surrounding the compartments.

To this end, the cabinet is provided with an outer casing which is substantially hermetically sealed throughout in a manner to reduce the infiltration of outside air into the casing. The casing has one or more access openings leading to the interior of compartments enclosed thereby and normally closed by one or more door structures engaging and sealing against the casing adjacent the openings.

The frozen food compartment is virtually surrounded on all sides, except the door side, with a freezing evaporator placed on the outside of the compartment, and the inner side of the compartment is made smooth to receive the frozen food packages and to be easily scraped of a slight amount of frost which may gather after long periods of use. This compartment is adapted to be maintained cold without defrosting for relatively long periods of time, such, for example, as from six months to over a year. Insulation is placed around the frozen food compartment made of hermetically sealed bags containing glass or mineral wool with the surfaces of the bags closely pressed against the outer surface of the frozen food compartment thereby blocking the access of moisture to the freezing evaporator to such an extent that only a slight amount of frost can ever gather on the outer surface of the frozen food compartment, the accumulation of which stops in the early days of operation, and cannot gather at all inside of the bags.

The unfrozen food compartment is also surrounded by similar bags of insulation pressed against the outer surface of the compartment so that substantially no moisture can gather on the outer walls of the unfrozen food compartment and cannot gather at all inside of the bags. The lower portion of the unfrozen food compartment may be surrounded and contacted by a refrigerant pan cooling evaporator which is in closed circuit relationship with a refrigerant condenser cooled by the primary refrigerant evaporating system herein described. This space, in the lower part of the unfrozen food compartment, is provided with one or more covered, humidity retaining, food receiving pans or drawers adapted to maintain a space at relatively low temperature and high humidity for storing of green vegetables and the like.

In order to cool the major portion of the unfrozen food compartment, and in order to prevent the accumulation of moisture either inside of the unfrozen food compartment or in the insulation space therearound, a frosting and defrosting evaporator is placed inside of the unfrozen food compartment and is preferably in the shape of a rectangular plate, vertically disposed in the upper rear part of the unfrozen food compartment. This frosting and defrosting evaporator may be cooled by placing it in closed refrigerant flow relationship with a condenser cooled by the freezing evaporator surrounding the frozen food compartment. The outer surface of the frosting and defrosting evaporator is colder than the outer surface of the pan cooling evaporator and hence continually freezes moisture from the insulation space and prevents any material accumulation within it.

A motor compressor unit and condenser are placed in the lower part of the refrigerator and are in refrigerant flow relationship with the freezing evaporator. The compressor is cycled frequently, at least several times a day, to maintain the desired temperature conditions in the refrigerator, and this is accomplished by providing a thermostatic switch having its thermostatic bulb mounted on a wall of the freezing compartment closely adjacent the condenser which is in refrigerant flow relationship with the frosting and defrosting evaporator. The switch starts and stops the compressor several times a day to maintain the freezing evaporator at a substantially constant and relatively low temperature.

The frosting and defrosting evaporator is defrosted by heating it with an electric heater for a few minutes, preferably during the night or early morning. The electric heater is controlled by an electric clock timer switch adapted to energize the heater for about twenty minutes more or less, some time during the night or early morning. During those twenty minutes, the clock timer disconnnects the compressor from the power supply. In addition, a thermostatic switch is made responsive to the temperature of the frosting and defrosting evaporator. This latter switch is in series with the electric clock timer and the electric heater and disconnects the heater from the power supply when the temperature of the frosting and defrosting evaporator rises to a temperature above 32° F., such as 36° F. Thereafter this thermostatic switch will not reclose until after the frosting and defrosting evaporator has been cooled to some temperature such as 18° F. by a subsequent cycling of the compressor.

The main energy of the electric heater is consumed in the melting of the frost from the frosting and defrosting evaporator so that substantially no heating energy is transferred to the freezing evaporator. When the defrosting operation has been completed, the electric heater is turned off by its thermostatic switch so that no undesired energy is produced between the time that the frosting and defrosting evaporator is defrosted and the time when the clock timer reenergizes the compressor.

This refrigerator is adapted to maintain the frozen food compartment uninterruptedly below 32° F. without defrosting for long periods of time, such, for example, as from six months to over a year, independently of the cycling of the motor compressor unit, which cycling occurs several times a day, and independently of the defrosting operation, since the defrosting operation is carried out so quickly and is localized at the frosting and defrosting evaporator. The refrigerator can operate at very high efficiency in all sections of the country under varying conditions of atmospheric temperature and humidity without becoming frost or moisture bound either within its food preserving compartments or within the insulation space of its casing.

Another object of this invention is to provide a refrigerator having a freezing compartment cooled by a freezing evaporator, and an unfrozen food compartment cooled by a frosting and defrosting evaporator, which latter evaporator is defrosted by an electric heater in such a manner that practically no heat is transferred to the freezing evaporator and freezing compartment, so that the frozen food is not warmed to any degree whatsoever, thus preventing the formation of ice coating around the frozen food in the frozen food compartment.

A further object of this invention is to provide an improved apparatus for and method of maintaining a freezing compartment of a multiple compartment refrigerator at a temperature below freezing while defrosting an evaporator utilized to cool the interior of another higher temperature food storage compartment of the refrigerator and without materially increasing the temperature of the food storage compartment.

Further objects and advantages of the present invention will be apparent from the following description, reference being had to the accompanying drawings, wherein a preferred form of the present invention is clearly shown.

Figure 1:
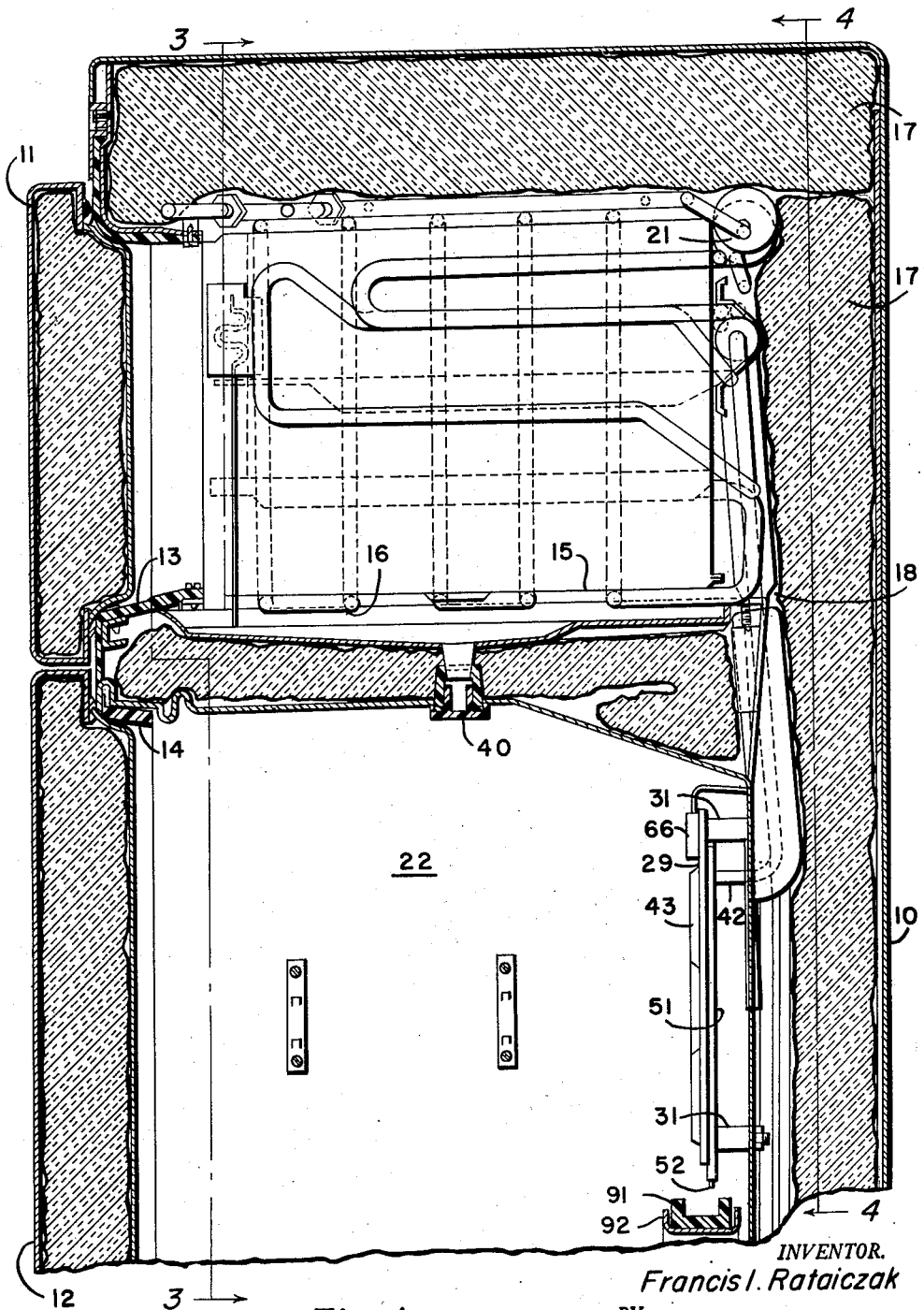
Fig. 1 is a vertical sectional view taken substantially along the line 1—1 of Figs. 3 and 4 with the side insulation removed, of the upper portion of a two temperature refrigerator embodying one form of my invention.
Figure 2:
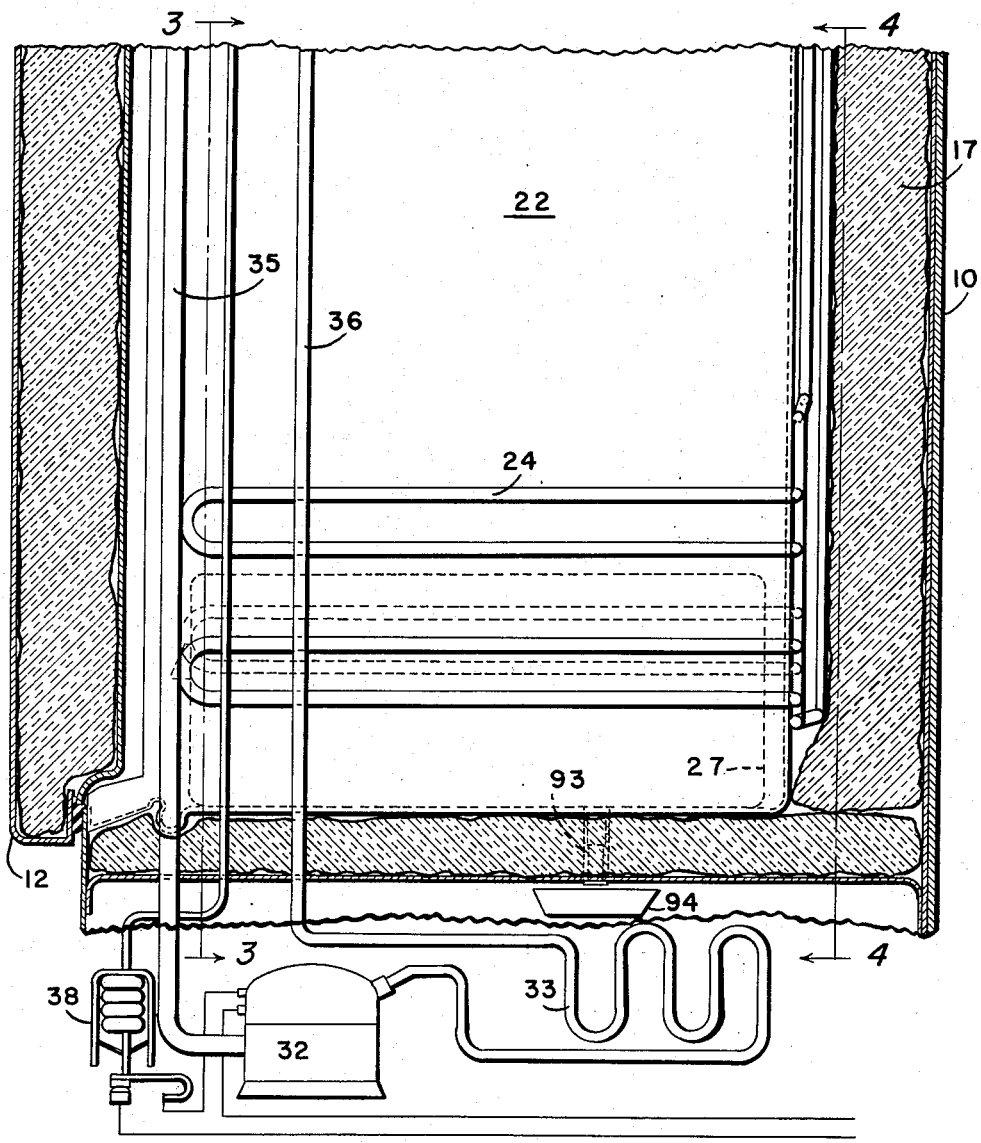
Fig. 2 is a vertical sectional view taken substantially along the line 2—2 of Figs. 3 and 4 with the side insulation removed, of the bottom portion of the two temperature refrigerator, the upper portion of which is shown in Fig. 1.
Figure 3:
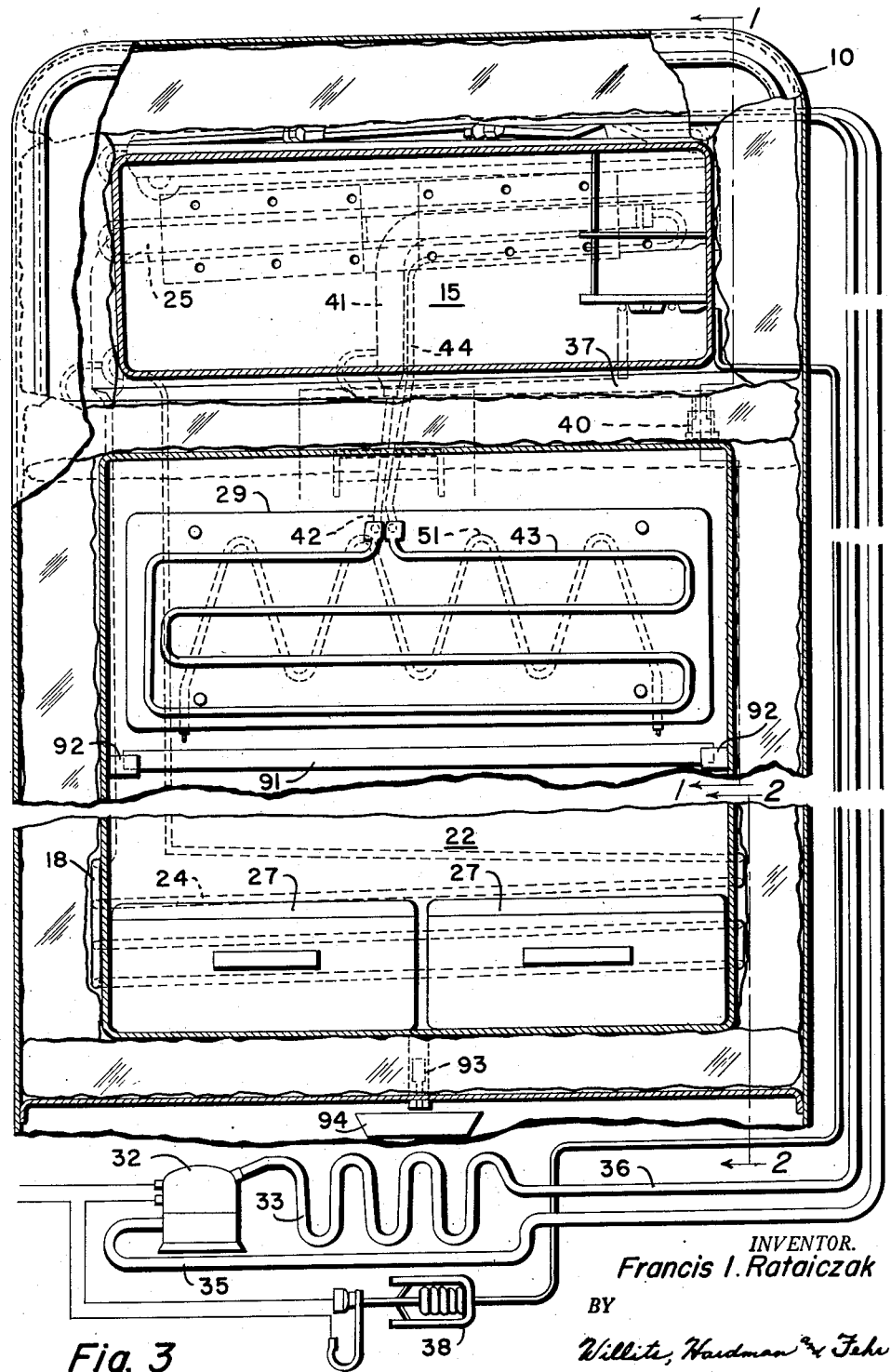
Fig. 3 is a fragmentary front vertical sectional view taken substantially along the line 3—3 of Figs. 1 and 2.
Figure 4:
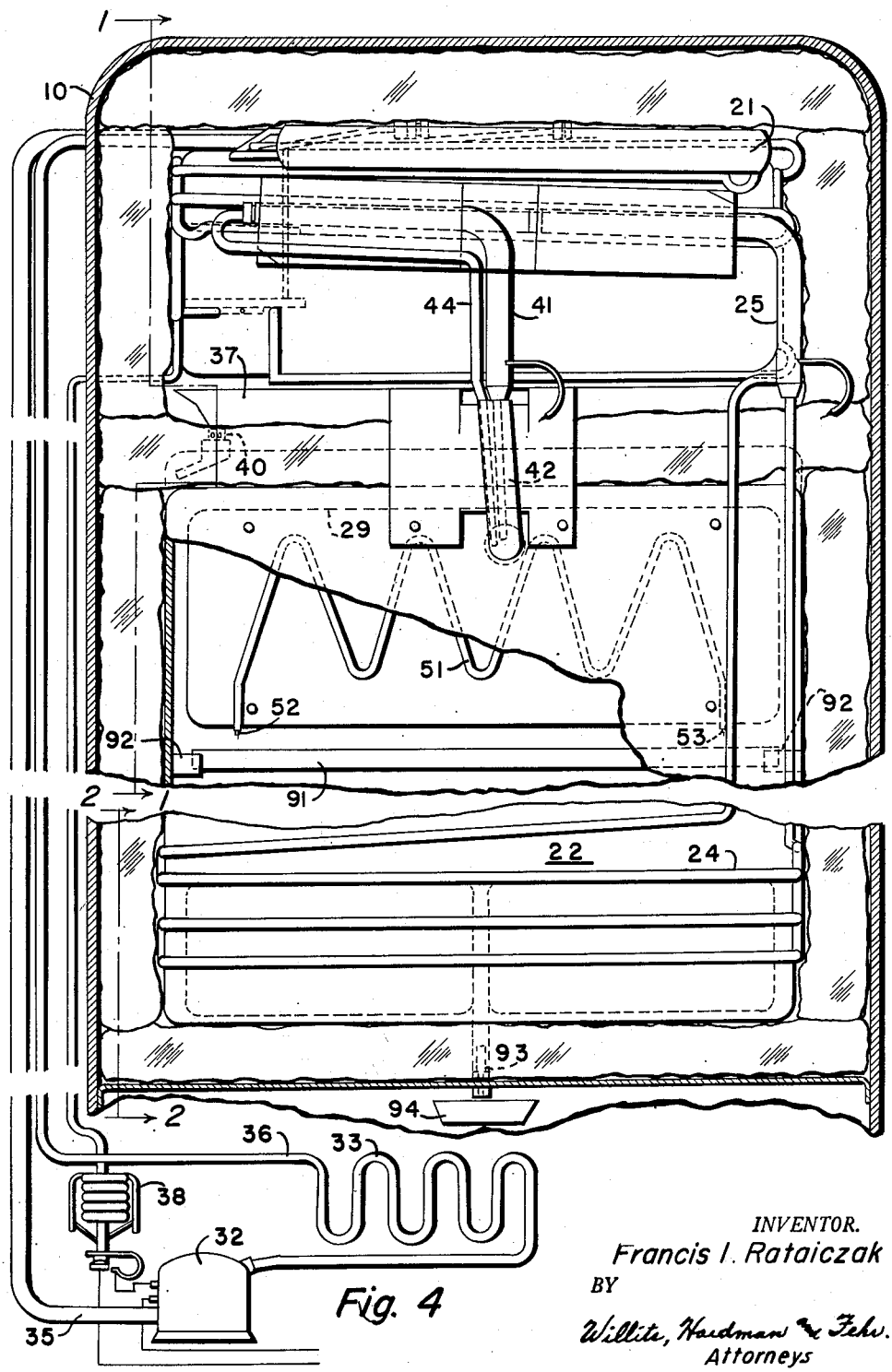
Fig. 4 is a fragmentary rear vertical sectional view taken substantially along the line 4—4 of Figs. 1 and 2, with the back insulation removed.

Referring now to the drawings, a refrigerator cabinet is provided with an outer casing 10 which is substantially hermetically sealed throughout and is engaged by door constructions, such as an upper door 11 and a lower door 12. These doors engage access openings 13 and 14 to reduce infiltration of outside air into the refrigerator.

A frozen food compartment 15 is virtually surrounded on all sides, except the access opening side 13 with a freezing evaporator 16, in the form of conduit convolutions, placed on the outside of the compartment 15 and in contact with walls thereof. The inner surface of walls of the compartment 15 is made smooth to receive frozen food packages and to be easily scraped of any slight amount of frost which may gather after long periods of use. To this end, the compartment may be made of five rectangular sides as shown in the drawings. This compartment is adapted to be maintained cold, without defrosting, for relatively long periods of time such, for example, as from six months to over a year. Insulation 17 is placed around the frozen food compartment 15 and within the doors 11 and 12. This insulation comprises glass or mineral wool hermetically sealed within flexible casings or bags 18 of some suitable plastic material such as polyethylene or polyvinylidene chloride which prevents breathing of air into or out of the insulation. The surfaces of bags 18 are closely pressed against the outer surface of the frozen food compartment 15 thereby blocking the access of moisture to the freezing evaporator 16 to such an extent that only a slight amount of frost can ever gather on the outer surfaces of the frozen food compartment and cannot gather at all inside the bags. The freezing evaporator may be constructed of a pipe or conduit bent or coiled in any convenient manner around the sides of the frozen food compartment 15 and terminates in a liquid refrigerant accumulator 21.

An unfrozen or higher temperature food compartment 22 is also provided in the refrigerator cabinet below the freezing or frozen food compartment 15 and is also surrounded by insulation, which may be in similar bag form pressed against the outer wall surface of this compartment so that substantially no moisture can gather on the outer walls of this compartment and no moisture whatever can gather inside of the bags. The lower portion of the unfrozen food compartment may be surrounded and contacted by a refrigerant pan cooling evaporator 24 which is suitably refrigerated, for example, by being connected in closed circuit relationship with a refrigerant condenser 25 cooled by the freezing primary evaporator 16. The closed circuit comprising the evaporator 24 and condenser 25 forms a secondary refrigerating system as is conventional and well known in the art. The space, in the lower part of the unfrozen food compartment, is provided with one or more covered, humidity retaining, food receiving hydrator pans or drawers 27 in which a relatively low temperature and high humidity is maintained for storing green vegetables and the like.

A frosting and defrosting evaporator 29 is placed inside of the unfrozen food compartment 22 and is preferably in the shape of a rectangular plate vertically mounted in the upper rear part of the unfrozen food compartment 22. Evaporator 29 is of the sheet metal type and is supported by insulating brackets 31. This evaporator is maintained normally at a temperature below 32° F., to prevent the accumulation of moisture either inside of the unfrozen food compartment or in the insulation space within casing 10. Its average temperature is substantially lower than the average temperature of the evaporator 24, so that any breathing action into and out of the insulation space tends to transfer moisture to the frosting and defrosting evaporator, and hence continually frees moisture from the insulation space and prevents any material accumulation thereof within it.

In consideration of the present structure it is desired to point out that moisture vapor tends to be cooled and collected upon the coldest surfaces of the refrigerator. Since it is difficult, if not impossible, to prevent collection of some moisture on the outer surfaces of compartment 15 or on the primary evaporator 16, there is provided, beneath the primary evaporator 16, a catch pan or tray 37 so that if the refrigerator should ever be disconnected from the source of electric power or be out of action for any other reasons for a sufficient length of time to cause the primary evaporator 16 to rise above 32° F., any frost or ice thereon would melt and drip therefrom into the tray 37. Pan or tray 37 is provided with a drain outlet 40 which extends into the higher temperature or unfrozen compartment 22, below freezing compartment 15, and is provided with a spout for discharging the water defrosting from walls of compartment 15 and evaporator 16 onto the vertical side wall of the liner of food compartment 22.

The frosting and defrosting plate evaporator 29 may be refrigerated, for convenience, by thermal exchange with the freezing evaporator 16. This exchange may be accomplished by providing a refrigerant condenser 41 adjacent to the evaporator 16. The condenser 41 feeds liquid refrigerant through the pipe 42 to coils 43 which comprise or are formed in the evaporator 29. Refrigerant evaporated in the coils 43 of the evaporator 29 returns to the condenser 41 through the pipe 44. The evaporator 29 and condenser 41 connected thereto forms a second refrigerating system or secondary circuit in the present disclosure.

Figure 5:
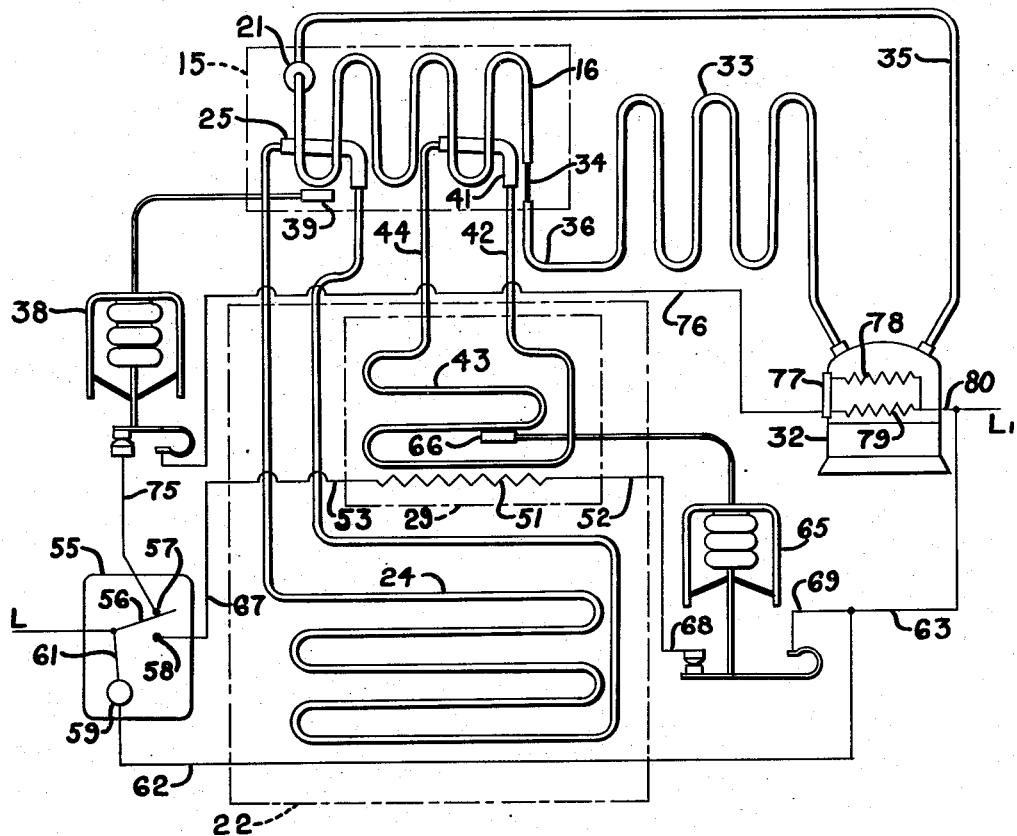
Fig. 5 is a diagrammatical view showing the refrigerating systems and the controls therefor.

A sealed motor-compressor unit 32 and a condenser 33 constitute a refrigerant translating or condensing unit which is placed in the lower part of the refrigerator cabinet and is in refrigerant flow relationship with the primary freezing evaporator 16 by pipe or conduit 36, through the medium of an expanding device or capillary tube restrictor 34 and a return pipe 35. This unit is cycled frequently, at least several times a day, to maintain the desired temperature conditions in the refrigerator. This is accomplished by providing a controller responsive to conditions in the cabinet, and may take the form of a snap acting thermostatic switch 38 (see Fig. 5) having its thermostatic bulb 39 closely adjacent the condenser 41 and evaporator 16. Such a switch is shown and described in the patent to A. O. Grooms No. 2,351,038. The switch 38 starts and stops the motor-compressor 32 several times a day to maintain the freezing evaporator 16 at a substantially constant and relatively low temperature such, for example, as between minus 5° F. and 12° F.

An electric heater 51 is in thermal contact with the frosting and defrosting evaporator 29. This electric heater conveniently may be a tubular sheathed heater having connectors 52 and 53 and may be attached in serpentine or any other suitable form to the back of the evaporator 29. The electric heater is controlled by a clock timer 55 (see Fig. 5) adapted to energize the heater 51 for about 20 minutes more or less, some time during the night or early morning. During the 20 minutes of energization of heater 51 timer 55 disconnects the motor-compressor 32 from the power supply. Conveniently this may be accomplished by providing a double throw blade 56 moving between the contacts 57 and 58. This blade is actuated by the timer motor 59 which is permanently connected between the power lines L and L₁, by wires 61, 62 and 63. A clock timer of the type disclosed diagrammatically in Fig. 5 of the drawings is well known in the art to which it belongs and the continuously running electric clock portion 59 thereof is usually provided with suitable reduction gearing to rotate a shaft one revolution every 24 hours. This rotatable shaft is ordinarily provided with a snap acting spring device or cam device (not shown) to engage and quickly throw the blade 56 from one contact 57 to the other contact 58, or vice versa, as the case may be. Such a spring device or cam device associated with and operated by the electric clock portion of clock timer 55 may be arranged to effect the movement of blade 56 to contact 58 and the holding of blade 56 in contact with contact 58 for any predetermined or desired period of time. Clock timer controls of this type are manufactured by various concerns and sold on the open market and may vary in construction somewhat relative to the mechanism employed to throw the blade 56 between the contacts 57 and 58. Such a clock timer forms means rendered effective automatically to carry out a substantially simultaneous energizing of the electric heater 51 and stopping of the motor-compressor 32 in the present disclosure. The electric heater 51 is also controlled by a thermostatic snap switch 65 which may be similar to switch 38 and has a thermostatic bulb 66 mounted on plate 29 so as to be responsive to the temperature of the frosting and defrosting evaporator coil 43 provided therein. Switch 65 may be mounted in any suitable or desirable location within or on the refrigerator cabinet and is shown in the diagrammatic illustration (Fig. 5) of the present invention. The heater 51 is energized when the blade 56 closes on contact 58 through wiring 67, 53, 52, 68, switch 65 and wires 69 and 63. The switch 65 is a snap acting switch which opens when the frosting and defrosting evaporator 29 rises to a temperature above 32° F., such as 36° F. and closes when the temperature of the coil 43 or evaporator plate 29 is reduced to a relatively low temperature, such as 18° F.

The energization of the electric heater 51 is of such a character that practically no heat is transferred to the freezing evaporator 16 or to the freezing compartment 15, so that the frozen food in the compartment 15 is not warmed to any substantial degree, thus preventing the melting of frost on the evaporator 16 and on packages of frozen foods stored in compartment 15 to thereby eliminate the formation of ice coating around the frozen food by any subsequent cycling of the compressor. The thermostatic switch 65 opens and stops energization of the heater 51 as soon as the coil 43 or evaporator plate 29 is satisfactorily defrosted and prevents any reenergization of the heater 51 until after the compressor has cycled at least once. The cycling of the motor-compressor unit 32 is accomplished when the blade 56 moves to the contact 57. The switch 36 opens and closes in response to the desired temperature conditions of the primary evaporator 16 and secondary evaporator 29, and energizes and deenergizes the unit 32 through the wiring 75, switch 38, wire 76, starting controller 77, starting winding 78, running winding 79 and wire 80, all which elements are between the power lines L and L₁ (see Fig. 5).

Moisture or water resulting from defrosting of the evaporator plate 29 drips into a trough 91 supported by suitable end brackets 92 and flows from the trough through grooves provided in the brackets 92, onto the side walls of food compartment 22. This defrosting water trickles down the side walls of compartment 22 and flows across the bottom wall thereof to a drain pipe 93 extending through the lower wall of the insulated casing 10. Drain pipe 93 conducts the water into a receptacle 94 ordinarily positioned in the upper portion of a lower machine compartment containing the refrigerant translating or condensing unit. Heat generated by and dissipated from the unit evaporates the water from the collecting receptacle 94 to atmosphere exteriorly of the refrigerator cabinet.

Figure 6:
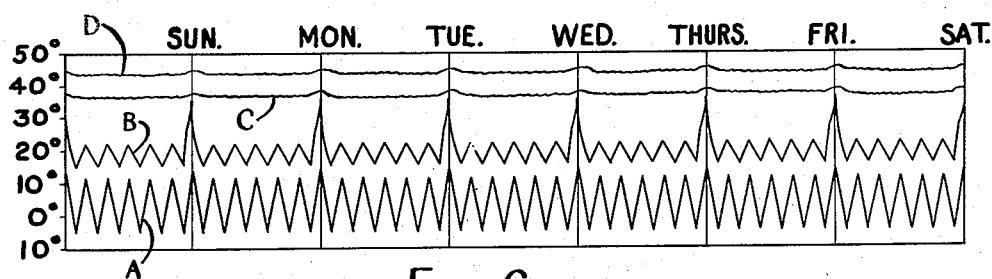
Fig. 6 is a temperature time chart of the three evaporators in the cabinet and of the temperature within the higher temperature food storage compartment.

The chart shown in Fig. 6 shows the relative temperatures of various parts of the refrigerator. The curve A indicates the temperature maintained in the freezing evaporator 16 while the interior of the freezing compartment 15 remains at a substantial constant sub-freezing temperature. Curve A indicates that the temperature rises and falls between the limits of about 12° F. and approximately minus 5° F., except for a very few minutes, once during each night or every 24 hours, at which time the temperature rises imperceptibly higher than 12° F. as indicated in the curve A. The curve B indicates the temperature of the frosting and defrosting evaporator plate 29. For example, the curve B indicates that the normal temperature of evaporator plate 29 is between the limits of about 22° F. and approximately 15° F., except for a few minutes during the defrosting period herebefore described, at which time the temperature rises temporarily to 36° F. The curve C indicates the temperature of the walls of the compartment 22 adjacent the evaporator 24 and hydrator pans 27. This illustrates the fact that moisture travel, due to breathing will be from the interior of the insulated casing in the lower part of the cabinet, to the frosting and defrosting evaporator 29. The curve C indicates that the temperature of the evaporator 24 is substantially constant, varying only an imperceptible amount during each cycling of the compressor, and only varying slightly more, still imperceptibly, during the defrosting period. The curve D indicates the temperature within the unfrozen food compartment 22 and illustrates imperceptible variations, quite similar to those of curve C, although the temperature during the short defrosting period may be slightly higher and quickly reduced to normal. These curves show that a refrigerator embodying this invention is adapted to maintain the frozen food compartment 15 uninterruptedly below 32° F. without defrosting for long periods of time such as from six months to over a year, independently of the cycling of the motor compressor unit, which cycling occurs several times a day, and independently of the defrosting operations, since the defrosting operations are carried out so quickly and localized at the frosting and defrosting evaporator. No ice coating is formed around the frozen food packages in the compartment 15 because this compartment is continuously below 32° F. even during the defrosting operations. A quick defrosting operation does not materially change the temperature in the unfrozen food compartment 22 except imperceptibly and for a very short time. Hence the food in compartment 22 is properly refrigerated and preserved throughout the various operations of the refrigerator.

In view of the foregoing, it should be apparent that I have provided an improved refrigerating apparatus for and method of maintaining a freezing compartment in a refrigerator cabinet at a substantially below freezing temperature while defrosting another evaporator employed to cool another compartment in the refrigerator. The present improved refrigerator can operate at very high efficiency in all sections of the country under varying atmospheric temperature and humidity conditions without becoming frost or moisture bound either within the food preserving compartments or within the insulating space about these compartments.

While the form of embodiment of the invention as herein disclosed constitutes a preferred form, it is to be understood that other forms might be adopted, as may come within the scope of the claims which follow.

What is claimed is as follows:

1. In combination, a refrigerator cabinet; a freezing compartment in said cabinet; a freezing evaporator cooling said freezing compartment; an unfrozen food storage compartment in said cabinet; said compartments being insulated from one another; a frosting and defrosting evaporator cooling said unfrozen food storage compartment; an electric heater in thermal contact with said frosting and defrosting evaporator; and means periodically energizing said electric heater to defrost said frosting and defrosting evaporator without the aid of additional means while maintaining the temperature in said freezing compartment substantially constant.

2. In combination, a refrigerator cabinet; a freezing compartment in said cabinet; a freezing evaporator cooling said freezing compartment; an unfrozen food storage compartment in said cabinet; said compartments being insulated from one another; a frosting and defrosting evaporator cooling said unfrozen food storage compartment; a compressor-condenser unit in refrigerant flow relationship with one of said evaporators and supplying refrigeration to the other of said evaporators; a controller responsive to a temperature condition in said cabinet starting and stopping said compressor-condenser unit; an electric heater in thermal contact with said frosting and defrosting evaporator, and a timer periodically deenergizing said compressor-condenser unit and energizing said electric heater to defrost said frosting and defrosting evaporator without the aid of additional means while maintaining the temperature in said freezing compartment substantially constant.

3. In combination, a refrigerator cabinet; a freezing compartment in said cabinet; a primary refrigerating system associated with said cabinet including a refrigerant translating unit and a freezing evaporator cooling said freezing compartment; an unfrozen food storage compartment in said cabinet; said compartments being insulated from one another; a closed secondary refrigerating system having a refrigerant condensing portion in heat exchange relationship with said freezing evaporator and a refrigerant evaporating frosting and defrosting portion within and exposed to the air in said unfrozen food storage compartment for cooling the same; a controller responsive to a temperature condition in said cabinet for rendering said unit operative and inoperative; an electric heater in thermal contact with said refrigerant evaporating portion of said closed secondary refrigerating system, and means rendered effective automatically for periodically energizing said electric heater to defrost said evaporating portion of said secondary refrigerating system without the aid of additional means while maintaining the temperature in said freezing compartment substantially constant.

4. In combination, a refrigerator cabinet; a freezing compartment in said cabinet; a primary refrigerating system associated with said cabinet including a refrigerant translating unit and a freezing evaporator cooling said freezing compartment; an unfrozen food storage compartment in said cabinet; said compartments being insulated from one another; a closed secondary refrigerating system having a refrigerant condensing portion in heat exchange relationship with said freezing evaporator and a refrigerant evaporating frosting and defrosting portion within and exposed to the air in said unfrozen food storage compartment for cooling the same; a controller responsive to a temperature condition in said cabinet for rendering said unit operative and inoperative; an electric heater in thermal contact with said refrigerant evaporating portion of said closed secondary refrigerating system, means rendered effective automatically for periodically energizing said electric heater to defrost said evaporating portion of said secondary refrigerating system without the aid of additional means while maintaining the temperature in said freezing compartment substantially constant; and means responsive to a temperature of said refrigerant evaporating portion of said secondary refrigerating system above 32° F. for deenergizing said electric heater.

5. In combination, a refrigerator cabinet; a below-freezing compartment in the upper part of said cabinet; a primary refrigerating system associated with said cabinet including a refrigerant compressing and condensing unit and an evaporator for cooling said freezing compartment below 32° F.; a higher temperature food storage compartment in the cabinet below said freezing compartment; said compartments being insulated from one another; a closed secondary refrigerating system having a refrigerant condensing portion in heat exchange relationship with the evaporator of said primary refrigerating system and a refrigerant evaporating frosting and defrosting portion within and exposed to the air in said higher temperature food storage compartment for cooling same; a controller responsive to the temperature of said below-freezing compartment for rendering said unit operative and inoperative; an electric heater in thermal contact with said refrigerant evaporating portion of said closed secondary refrigerating system, a timer for periodically and substantially simultaneously rendering said unit inoperative and said electric heater effective to defrost said refrigerant evaporating portion of said secondary refrigerating system without the aid of additional means while maintaining the temperature in said below freezing compartment substantially constant, and means responsive to a temperature of said refrigerant evaporating portion of said secondary refrigerating system above 32° F. for rendering said electric heater ineffective.

6. In combination, a refrigerator cabinet; a freezing compartment in said cabinet; a freezing evaporator outside of and contacting walls of said freezing compartment for cooling the interior thereof; an unfrozen food storage compartment in said cabinet; said compartments being insulated from one another; a frosting and defrosting evaporator in the form of a plate disposed within and exposed to the air in said unfrozen food storage compartment; said plate being normally maintained at a temperature below 32° F.; an electric heater in thermal contact with said plate; means periodically energizing said electric heater to increase the temperature of said plate above 32° F. for removing frost therefrom without the aid of additional means while maintaining the temperature in said frozen food compartment substantially constant; and means responsive to a temperature of said plate approximating 36° F. for deenergizing said electric heater.

7. In combination, a refrigerator cabinet; a freezing compartment in said cabinet; a freezing evaporator outside of and contacting walls of said freezing compartment for cooling the interior thereof; an unfrozen food storage compartment in said cabinet; said compartments being insulated from one another; a frosting and defrosting evaporator in the form of a plate disposed within and exposed to the air in said unfrozen food storage compartment; said plate being normally maintained at a temperature below 32° F.; an electric heater in thermal contact with said plate; a normally open electric circuit for said heater; means interposed in said electric circuit and rendered effective automatically by an electric clock for periodically closing the circuit to said electric heater to energize the same and defrost said frosting and defrosting evaporator without the aid of additional means while maintaining the temperature in said freezing compartment substantially constant; and a thermostatic switch responsive to a temperature of said plate above 32° F. for opening said electric circuit and deenergizing said heater.

8. Refrigerating apparatus including an insulated refrigerator cabinet having a frozen food storage compartment and an unfrozen food storage compartment therein; a refrigerating system including a freezing evaporator in heat exchange relationship with said frozen food storage compartment and a refrigerated plate evaporator located entirely within and exposed to the air in said unfrozen food storage compartment; means thermally shielding the freezing evaporator from the unfrozen food storage compartment; an electric heater in thermal contact with said refrigerated plate; control means for said refrigerating system normally maintaining said freezing evaporator and said plate evaporator below freezing temperatures; means rendered effective automatically by an electric clock for periodically energizing said electric heater to defrost said plate evaporator without the aid of additional means and while maintaining the temperature of said frozen food compartment substantially constant; means responsive to a temperature of said plate evaporator above 32° F. for deenergizing said electric heater; and said last named means being rendered effective prior to an increase in temperature of said freezing evaporator above 32° F.

FRANCIS I. RATAICZAK.

References Cited in the file of this patent

UNITED STATES PATENTS

| Number | Name | Date |
|---|---|---|
| 1,913,433 | Doble | June 13, 1933 |
| 2,033,554 | Smith | Mar. 10, 1936 |
| 2,036,565 | Brouse | Apr. 7, 1936 |
| 2,285,701 | D'Olive | June 9, 1942 |
| 2,292,405 | Reeves | Aug. 11, 1942 |
| 2,293,360 | Reilly | Aug. 18, 1942 |
| 2,301,313 | Money | Nov. 10, 1942 |
| 2,313,390 | Newton | Mar. 9, 1943 |
| 2,487,182 | Richard | Nov. 8, 1949 |
| 2,601,466 | Thomas | June 24, 1952 |